UNITED STATES PATENT OFFICE

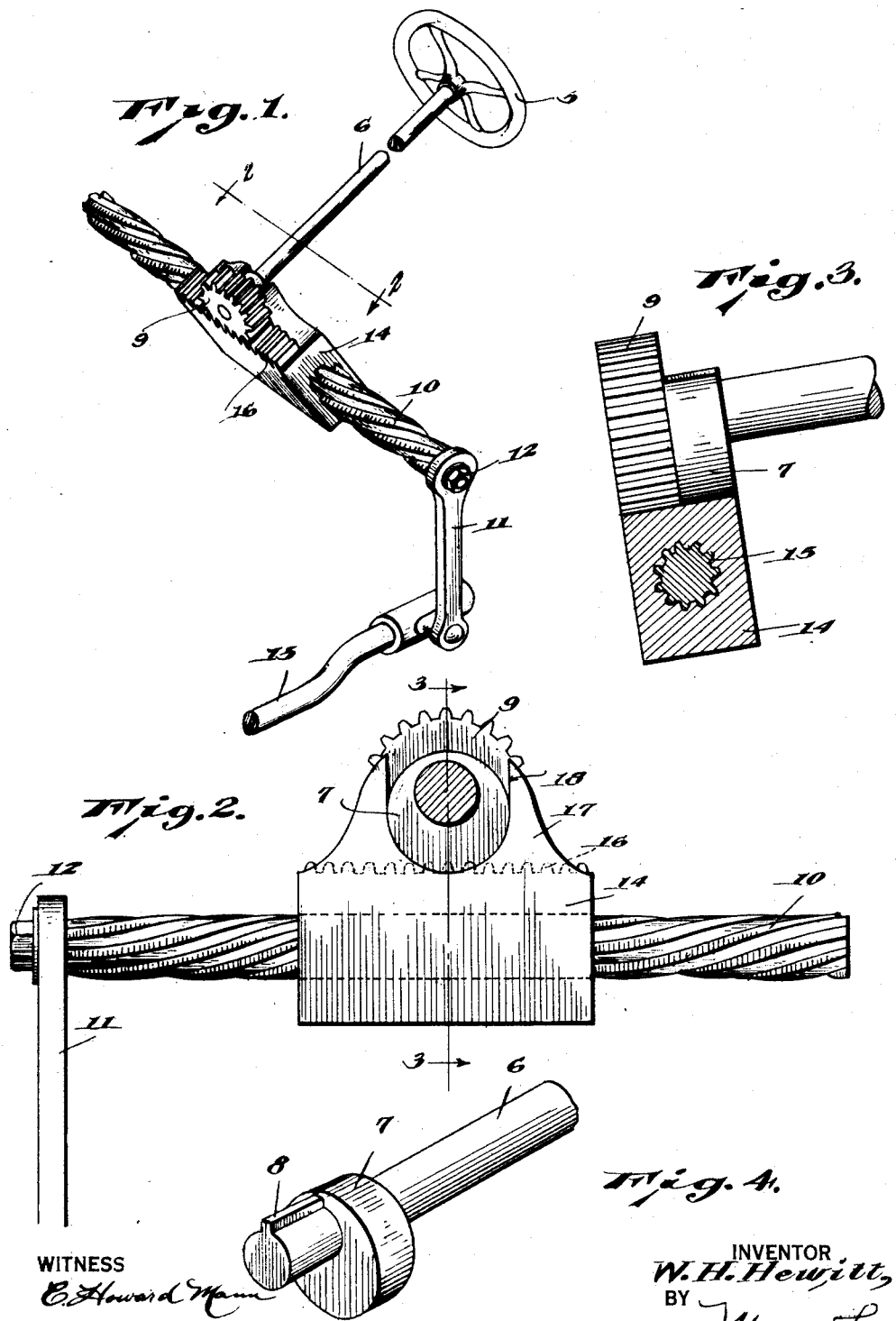

WILLIAM HESTON HEWITT, OF CUMBERLAND, MARYLAND, ASSIGNOR OF ONE-THIRD TO ORA MONROE DOOLITTLE AND ONE-THIRD TO JOSEPH MONNELL, BOTH OF CUMBERLAND, MARYLAND

STEERING GEAR

Application filed October 14, 1930. Serial No. 488,643.

My invention relates to steering gears and particularly to a steering gear for motor vehicles such as an automobile, truck, or bus.

It is an object of the invention to provide a device of this character which will be easier to operate than the conventional steering gear in common use and which will be composed of relatively few parts.

The invention further consists in providing means which will prevent any reaction or back lash due to the wheels of the vehicle striking an obstruction in the roadway.

Other important objects and advantages will become apparent during the course of the following detailed description, taken in conjunction with the accompanying drawings forming a part of this application, in which:

Figure 1 is a perspective view of the improved device;

Fig. 2 is a section on the line 2—2 of Fig. 1;

Fig. 3 is a section on the line 3—3 of Fig. 1; and

Fig. 4 is a perspective view of the end of the steering shaft.

Referring now particularly to the drawings in which like numerals refer to like parts throughout the same, 5 designates a steering wheel of conventional construction provided with a steering shaft 6 extending downwardly therefrom at an angle as is the usual custom.

The lower end of the steering shaft 6 is formed with an eccentric element 7 which may be integral therewith or rigidly secured thereto as desired. A key 8 is also formed with the shaft between the eccentric element 7 and the extremity thereof. The key 8 is for the purpose of mounting a pinion 9 on the end of the shaft, the pinion to be driven by the shaft. Extending transversely of a steering box (not shown) is a rotatable worm shaft 10 provided with helical grooves. The shaft 10 has the usual steering arm 11 secured to the end thereof by means of a nut 12 or the like and the steering arm 11 connects with the usual drag link 14 of a conventional steering mechanism, (not shown).

Mounted for reciprocation relative to the shaft 10 is an elongated nut member 14, the bore of which is provided with helical grooves or threads 15 to correspond with the grooves and teeth on the shaft 10. The nut 14 is non-rotatably mounted for reciprocation in bearings (not shown) and is provided along one edge of the upper face thereof with teeth 16 which form a rack for cooperation with the pinion 9 on the end of the steering shaft 6. It will therefore be evident that rotation of the shaft 6 results in a reciprocation of the nut 15 through the driving connection provided by pinion 9 and teeth 16.

The upper face of the nut 14, adjacent the teeth 16, is formed with an upstanding portion 17 which is provided with a bearing slot 18 for the accommodation of the eccentric 7. The eccentric 7, bearing against the sides of the slot 18, provides a means for dampening or eliminating back lash when the front wheels of the vehicle strike an obstruction in the roadway since the nut due to engaging a large portion of the circumference of the eccentric will tend to move it bodily rather than to rotate it. The eccentric also aids in the reciprocation of the nut 14 due to the cam action of the eccentric upon rotation thereof.

In the operation of the steering mechanism, rotation of the steering wheel 5 results in rotation of the pinion 9 and eccentric 7 which combine to effect a reciprocation of the nut 14. The nut 14 being non-rotatably mounted upon the worm shaft 10, reciprocation thereof will result in rotation of the shaft 10 in either direction, depending upon the direction of movement of the nut. Rotation of the shaft 10 results in the steering of the vehicle through the steering arm 11 and drag link 13 as will be readily understood.

Although a preferred embodiment of the invention has been shown and described it is to be understood that various changes in the details of construction may be made without departing from the spirit of the invention as defined by the appended claims.

I claim:

1. A steering mechanism including a worm shaft, a reciprocable nut carried thereby, a rack carried by said nut, bearing members formed with said nut, a steering shaft, a pinion carried thereby for cooperation with said rack, and an eccentric element also carried by said steering shaft and disposed between said bearing members.

2. A steering mechanism including a horizontal rotatable worm shaft, a reciprocable nut carried by said shaft intermediate the ends thereof, a rack carried by the upper face of said nut at one edge thereof, said nut having a bearing slot formed adjacent said rack, a steering shaft, a pinion carried by said steering shaft, and an eccentric element also carried by said steering shaft adjacent said pinion, said pinion engaging said rack and said eccentric engaging the walls of said slot whereby to reciprocate said nut upon rotation of said steering shaft.

WILLIAM HESTON HEWITT.